Feb. 26, 1952  P. C. ANDERSON  2,587,085
DEVICE FOR APPLYING LIQUID FERTILIZER
Filed March 13, 1947  2 SHEETS—SHEET 2

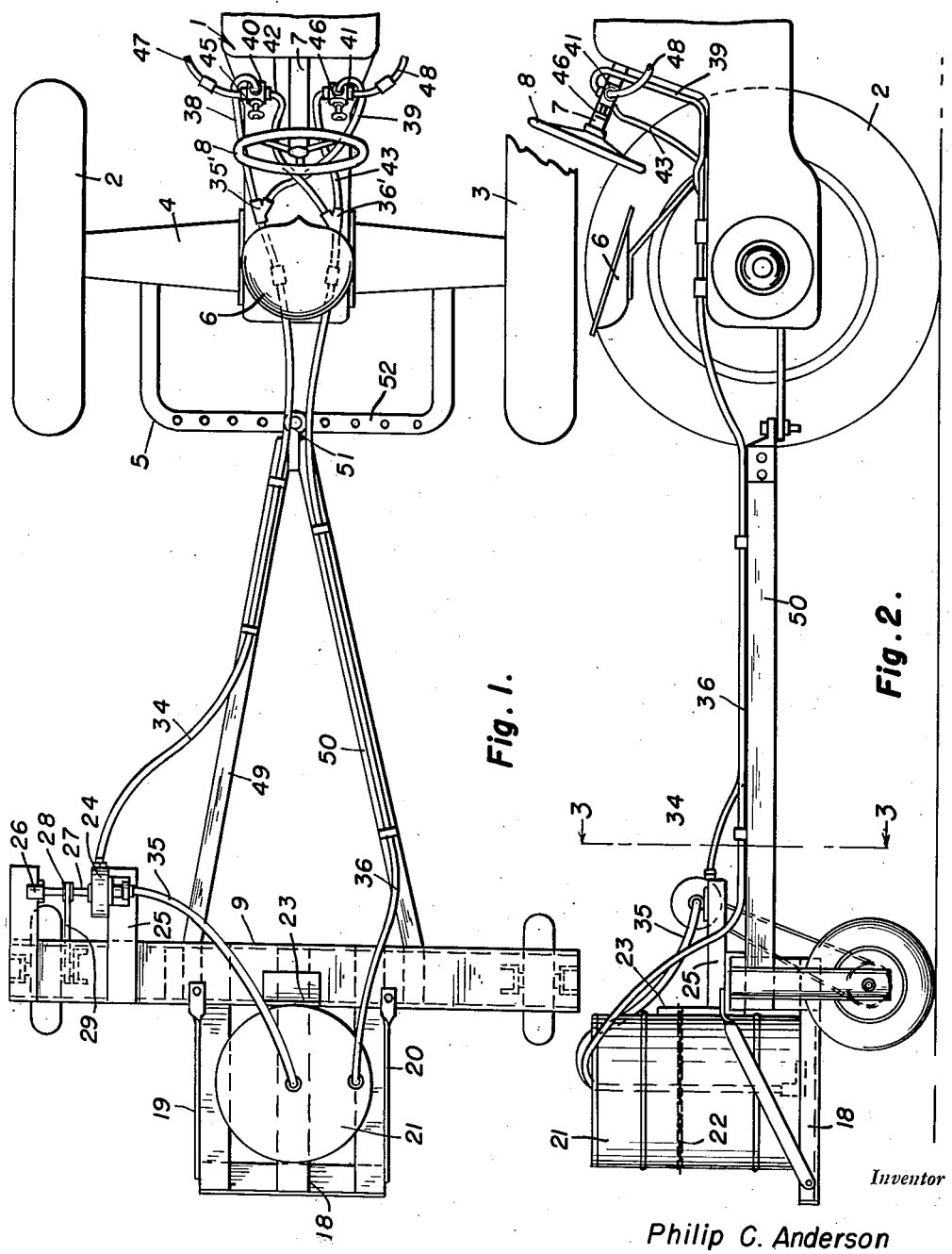

Inventor
Philip C. Anderson

By *Clarence A. O'Brien
and Harvey B. Jacobson*
Attorneys

Patented Feb. 26, 1952

2,587,085

UNITED STATES PATENT OFFICE 2,587,085

DEVICE FOR APPLYING LIQUID FERTILIZER

Philip C. Anderson, Crete, Nebr.

Application March 13, 1947, Serial No. 734,349

2 Claims. (Cl. 280—5)

This invention relates to improvements in devices for applying liquid fertilizer.

An object of the invention is to provide a wheel-supported tank and interconnected pump mechanism driven by said wheels, and said device being adapted to be attached to the draw-bar of a tractor and controlled by the driver of the tractor from the driver's seat for side dressing liquid fertilizer near two crop rows at the sides of the tractor as it moves down the said rows.

Another object of the invention is to provide an improved wheel-supported truck upon which a tank is mounted for holding a supply of liquid fertilizer, together with a pump driven by a pulley and belt connection with one of the truck wheels, and flexible tubing connections to the steering post of a tractor to which the truck will be attached for pulling along crop rows, said flexible connections being attached to control boxes whereby the driver of the tractor may control the amount of liquid fertilizer being side dressed from the opposite sides of the tractor near the crop rows as the tractor moves down the rows.

A further object of the invention is to provide an improved device for applying liquid fertilizer comprising a two-wheeled truck having a V-tongue adapted to be connected with the draw-bar of a tractor, with a platform supported by said truck upon which a tank for holding liquid fertilizer may be detachably secured, and a pump mounted upon said truck driven by a pulley and belt connection from one of the truck wheels, whereby connections will be made from the pump to the tank of liquid fertilizer and from the tank to a control box on the steering column of the tractor, and a return connection from said control box back to the pump, together with means for side dressing the liquid fertilizer from one or both sides of the tractor as the driver of the tractor runs it between the crop rows.

A still further object of the invention is to provide an improved device for applying liquid fertilizer to crop rows which will be tractor-hauled, and which will be self-contained and self-operated for side dressing liquid fertilizer near two crop rows.

Another object of the invention is to provide an improved device for applying liquid fertilizer to crop rows which will be highly efficient in operation, and relatively inexpensive to manufacture and produce.

Other objects will appear as the description proceeds.

In the accompanying drawings which form a part of this application,

Figure 1 is a plan view of the improved device for applying liquid fertilizer showing the same attached to the draw-bar of a tractor;

Figure 2 is a side elevation of the improved device for applying liquid fertilizer showing the same attached to the draw-bar of a tractor;

Like characters of references are used throughout the following specification and the accompanying drawings to designate corresponding parts.

Figure 3:
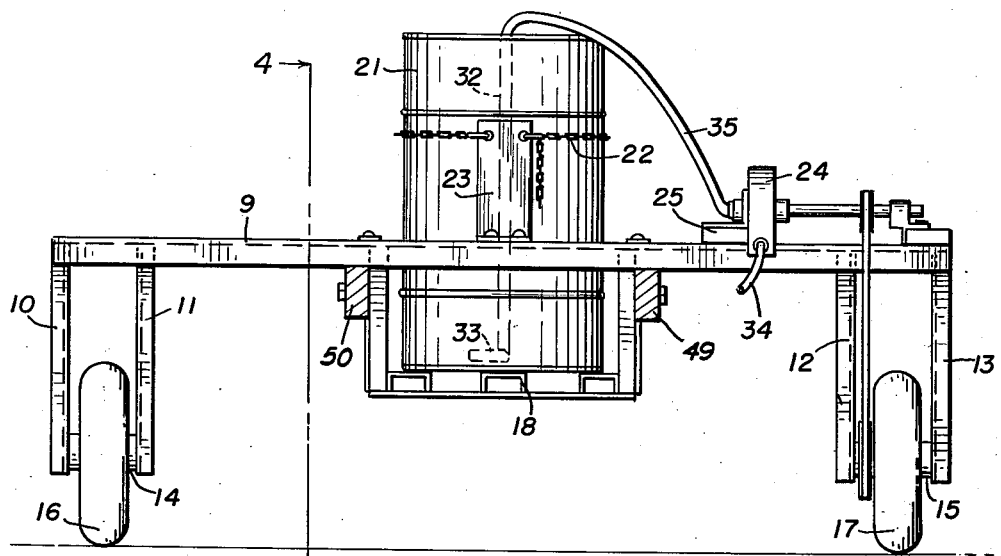
Figure 3 is a view taken on the line 3—3 of Figure 2.
Figure 4:
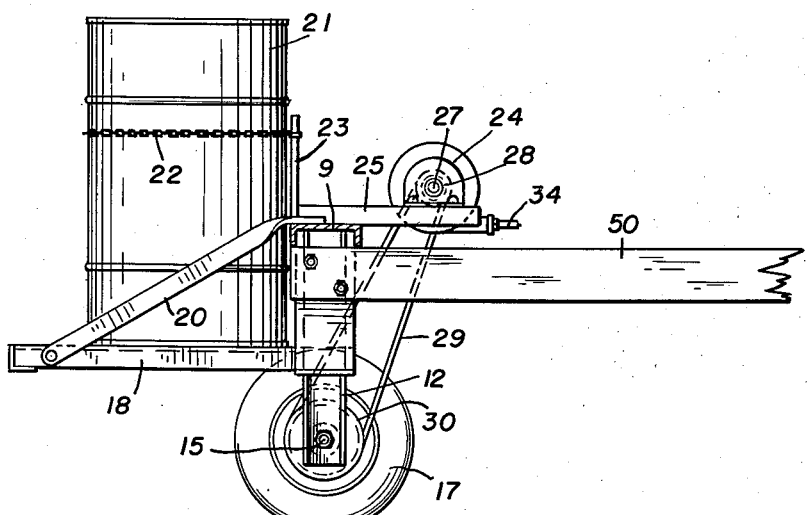
Figure 4 is a view taken on the line 4—4 of Figure 3.

In carrying out the invention, there is provided a tractor generally denoted by the reference numeral 1 having the usual rear wheels 2 and 3 supported at the outer end of the rear axle housing 4, and a U-shaped draw-bar 5 secured to said rear axle housing. The tractor 1 will also be provided with a driver's seat 6, and a steering column 7 with a steering wheel 8 disposed at the upper rear end thereof.

The device for applying liquid fertilizer includes a truck frame comprising a transversely extending inverted U-shaped body frame 9 having depending spaced parallel fork arms 10 and 11, and 12 and 13 arranged at the opposite ends thereof and adapted to support the axles 14 and 15, respectively, upon which the wheels 16 and 17 are mounted for supporting the device and for moving the same over the ground.

A rearwardly extending supporting platform 18 will be bolted to the transverse body frame 9 and will be provided with the angularly disposed brace members 19 and 20 at the opposite sides thereof.

The frame 18 will be of sufficient length so that when the truck body or body frame 9 is tilted rearwardly, the rear end of said frame 18 will contact the ground so that a receptacle or tank 21 may be rolled upon the said frame 18, after which the body frame 9 will be leveled and the tank secured in place by means of the encircling chains 22 which are secured to the upwardly extending standard 23 supported upon said body frame 9.

A rotary pump 24 will be mounted upon a forwardly extending supporting arm 25 and will have its shaft mounted in a bearing 26 supported upon the body frame 9, and said pump 24 will support the pulley 28 which will be connected by means of the belt 29 with a large pulley 30 secured to the axle 15 of the truck which supports the wheel 17, whereby movement of the said wheel will impart movement at a rate of speed consistent with the speed at which the truck is being pulled to provide the desired discharge of liquid fertilizer.

A flexible tube 35 will be connected between the pump 24 and the tank 21 to be connected at the upper end of the outlet pipe 32 which extends downwardly within the tank 21 to a point adjacent the bottom thereof, and supports the filter strainer 33 on its lowermost end for filtering and straining the liquid fertilizer before it is discharged through the pump.

Another flexible tube 34 is connected with the discharge side of the pump 24 and extends upwardly to a Y connection 35' adjacent the driver's seat 6, while a third flexible connection or tube is connected with the tank 21 between the same and a second Y connection 36', also adjacent the driver's seat 6.

The flexible tubes 38 and 39 from the Y connection 35' are connected with the control boxes 40 and 41, while the flexible tubes 42 and 43 from the Y connection 36' lead to the said control boxes 40 and 41.

Suitable manually operated valves 45 and 46 will be incorporated in the control boxes 40 and 41, respectively, for controlling the flow of the liquid fertilizer pumped from the tank 21 through the discharge tubes 47 and 48 which are connected with suitable spray heads and directed to the opposite sides of the tractor 1 for side dressing the liquid fertilizer near the crop rows as the tractor 1 moves between the crop rows hauling the device behind it for applying liquid fertilizer.

From the foregoing description, it will be apparent that one man may readily operate the device for applying liquid fertilizer by first securing a full tank of liquid fertilizer upon the tank-supporting frame 18 and hooking the forwardly extending tongue members 49 and 50 by means of the clevis 51 to the draw-bar 5 attached to the said tractor, and driving the tractor with the device attached thereto between the crop rows and controlling the flow of the liquid fertilizer side dressed from the discharge heads.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. A vehicle structure comprising an inverted U-shaped frame having depending legs and a web connecting the upper ends of said legs, a tongue secured to said web, wheels mounted adjacent the lower ends of said legs to support said frame, a tank frame attached to said web and disposed below said web, said tank frame being disposed between said wheels, supports extending from said web and secured to said tank frame, a tank disposed on said tank frame and adapted to retain fluent material, a post rising substantially vertically from said web intermediate the ends thereof, and a flexible member secured to said post and extending around said tank to retain said tank on said tank frame.

2. A wheel supported device for applying liquid fertilizer comprising a tongue, an inverted U-shaped frame having legs and a web, said tongue being attached to the web of said U-shaped frame, wheels mounted adjacent the ends of said legs, a frame attached to said web and disposed beneath said tongue, supports extending from said web to said frame, a tank disposed on said last-mentioned frame, a post secured to said web and a flexible member embracing said tank attached to said post.

PHILIP C. ANDERSON.

REFERENCES CITED

The following references are of record in the file of this patent:

UNITED STATES PATENTS

| Number | Name | Date |
|---|---|---|
| 510,287 | Peppler | Dec. 5, 1893 |
| 516,350 | Weigand | Mar. 13, 1894 |
| 1,184,578 | Seale | May 23, 1916 |
| 1,747,793 | Pounds et al. | Feb. 18, 1930 |
| 2,211,519 | Simmons | Aug. 13, 1940 |
| 2,226,192 | Barrett | Dec. 24, 1940 |
| 2,246,866 | Stribling et al. | June 24, 1941 |
| 2,275,302 | Magnuson | Mar. 3, 1942 |
| 2,381,649 | Dalton | Aug. 7, 1945 |

FOREIGN PATENTS

| Number | Country | Date |
|---|---|---|
| 11,213 | Netherlands | June 16, 1924 |
| 12,949 | Germany | 1880 |